April 15, 1924.
A. B. SEVERN
ROLLER SIDE BEARING
Filed May 11, 1923
1,490,490
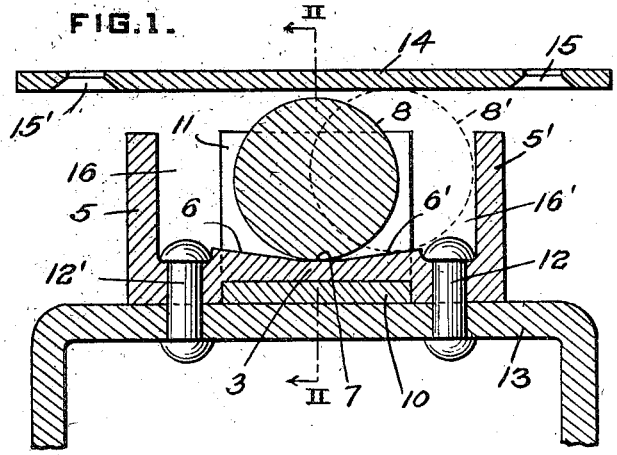
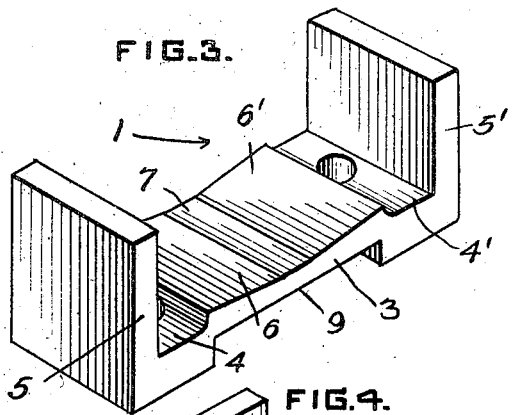
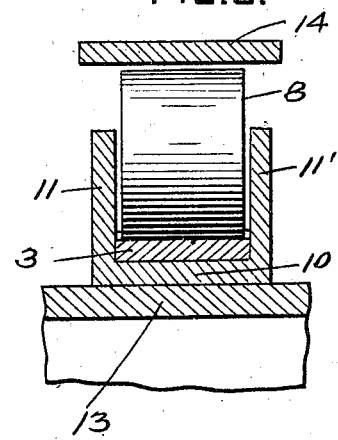
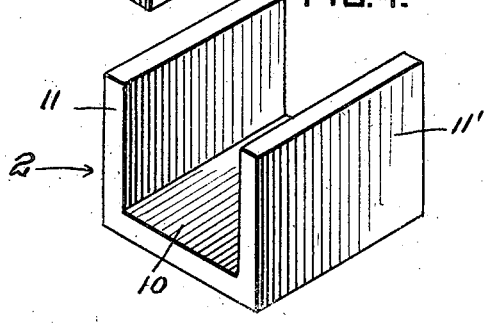
WITNESSES
INVENTOR
Arthur B. Severn
By Winter & Brown
His Attys Patented Apr. 15, 1924.

1,490,490

UNITED STATES PATENT OFFICE.

ARTHUR B. SEVERN, OF PITTSBURGH, PENNSYLVANIA, ASSIGNOR TO A. STUCKI, OF PITTSBURGH, PENNSYLVANIA.

ROLLER SIDE BEARING.

Application filed May 11, 1923. Serial No. 638,188.

*To all whom it may concern:*

Be it known that I, ARTHUR B. SEVERN, a citizen of the United States, and a resident of Pittsburgh, in the county of Allegheny and State of Pennsylvania, have invented a new and useful Improvement in Roller Side Bearings, of which the following is a specification.

This invention relates to side bearings, and particularly to side bearings for railway cars in which one bearing surface or wear plate is affixed to the truck while the remaining one is attached to the car body.

It is an object of the invention to provide a bearing of this type which is simple in construction, contains but a few parts, is easy and economical to manufacture, is highly effective in operation, and is self-cleaning.

It is a special object to provide a bearing in which the cage for retaining the roller in position is composed of but two cooperating parts attached to the truck bolster and interlocked in such fashion that the fastening of one firmly retains the other in position.

It is a further special object to provide a bearing of the character referred to in which both sections of the cage may be readily fabricated by rolling instead of by casting or other similar expensive and objectionable processes now commonly employed.

It is still a further special object to construct the entire cage for the bearing from a pair of rolled U-shaped channel sections disposed transversely of each other with the legs of the respective sections serving as the side and end walls of the cage.

These and other objects of the invention will more fully appear when taken in conjunction with the following description and the appended claims.

In the accompanying drawings, Fig. 1 is a vertical sectional view illustrating the preferred embodiment of the invention, Fig. 2 a transverse sectional view taken on the line II—II of Fig. 1; Fig. 3 a perspective view of one of the cage sections; and Fig. 4 a perspective view, similar to Fig. 3, of the remaining cage section which cooperates and interlocks with the section illustrated in Fig. 3.

The cage sections are indicated generally by the reference numerals 1 and 2, illustrated in detail in Figs. 3 and 4, respectively. Each of the cage sections is U-shaped in cross section, and is preferably fabricated by the process of rolling, which consists in rolling comparatively long channels and subsequently severing or cutting the same into lengths suitable for the particular sized bearing to be constructed.

The cage section illustrated in Fig. 3 consists of a base or floor portion 3 recessed at 4, 4', adjacent its ends, and beyond which points are the upstanding leg portions 5, 5', forming the end walls of the cage. The upper surface of the portion 3 intermediate the depressions 4, 4' inclines downwardly as shown at 6, 6', towards a flat intermediate portion 7 whereby to render the roller 8 self-centering. The lower face of the floor portion 3 intermediate its ends is recessed or notched as shown at 9, the notch corresponding in depth to the thickness of the floor portion of the remaining channel section illustrated in Fig. 4, and extending throughout the entire width of the portion 3.

The remaining section of the cage is also U-shaped in cross section consisting of the plain floor portion 10 and the upstanding leg portions 11, 11', forming the side walls of the cage. The thickness of the floor portion 10 corresponds to the depth of the notch 9 and its remaining dimensions are such that the portion 10 fits snugly and is housed within the said notch with the sides 11, 11', extending upwardly in close proximity to the edges of the lower bearing surface, as clearly shown in Figs. 1 and 2.

In assembling the cage sections, that illustrated in Fig. 4 is interlocked with that shown in Fig. 3, in such manner that the floor portion 10 lies within the notch 9, and with the parts in such interlocked condition, the cage is fixed in position upon the car truck. The preferred method of attaching the cage to the truck, is by means of bolting or riveting the same as indicated at 12, 12', to the truck bolster 13, the upper heads of the rivets lying within the depressed portions 4, 4', so as not to interfere with the free travel of the roller throughout its entire path, that is, in moving from its central position to an extreme position such as indicated by the dotted lines 8' in Fig. 1.

The cylindrical or other suitable shaped roller 8 is freely mounted within the cage, resting upon the lower bearing surface, previously described, and cooperates with an upper wear plate 14 suitably attached to the car body. The upper wear plate may be attached to the body in a number of well known ways, one method of attaching the same being by riveting or bolting, for which purpose suitable apertures such as indicated at 15, 15' are provided.

The upper edges of the side and end walls preferably terminate in the same horizontal plane, as indicated in Fig. 1, and the side walls 11, 11' are spaced at a distance from the end walls 5, 5', so as to leave open spaces such as shown at 16, 16' immediately adjacent the corners of the cage whereby to render the bearing self-cleaning, these openings extending the full height of the cage.

In operation, the upper bearing surface or wear plate 14 is normally out of contact with the roller 8 which remains in its centered position, as shown in Fig. 1. Whenever the car body sways sufficiently, as in rounding curves, the bearing plate 14 is brought into contact with the roller, and during subsequent swivelling movement between the truck and car body the roller will be forced to travel along the lower bearing surface towards the end wall 5, 5', in a well known manner. Immediately after contact between the upper bearing plate and the roller 8 is broken, due to upward movement of the wear plate 14, the roller immediately returns to its normal centered position due to the downwardly inclined portions 6, 6', causing the roller to rest upon the intermediate flat portion 7. During the entire operation, the roller 8 is confined within the cage by means of the upstanding side and end walls, and any dirt or foreign matter may readily escape outwardly through the corner openings 16, 16'.

It is noted that the two sections forming the cage are rigidly interlocked by means of the engagement of portion 10 with the notch 9, and that both sections are firmly fixed in operative position by means of attaching rivets or bolts 12, 12', employed in connection with the cage section illustrated in Fig. 3, that is, the same set of rivets or bolts serve to mount both cage sections upon the supporting bolster or truck.

It is thus seen that the invention provides a roller side bearing which is extremely simple in construction, comprises a minimum number of parts, is easy and economical to manufacture, is efficient in operation, is self-cleaning due to the free exposure of the bearing surfaces at the sides and ends, and provides a construction whereby the cage may be readily fabricated from rolled channel sections which are interlocked and firmly fixed in operative position by a single set of attaching devices.

I claim:

1. A roller side bearing for railway cars comprising a cage consisting of two interlocked channel sections, each section providing a pair of retaining walls, an upper bearing surface, and a free roller disposed within the said cage.

2. A roller side bearing for railway cars comprising a cage consisting of two interlocked channel sections disposed transversely of each other, the floor portion of one section overlying the floor portion of the other section, and each section providing a pair of retaining walls, an upper bearing surface and a free roller disposed within said cage.

3. A roller side bearing for railway cars comprising a cage consisting of two interlocked U-shaped channel sections disposed substantially at right angles to each other, the sections forming side and end walls respectively for the cage, an upper bearing surface and a free roller disposed within the cage.

4. A roller side bearing for railway cars comprising a cage consisting of two U-shaped rolled channel sections, one of said sections having a floor portion providing a lower bearing surface and upstanding legs forming end walls for the cage, the lower face of said floor portion being notched intermediate its ends throughout its width, the remaining section being disposed transversely to the first named section and having its floor portion fitting neatly within the said notch and its upstanding leg portions forming the side walls of the cage, an upper bearing surface, and a free roller disposed within the cage.

5. A roller side bearing for railway cars comprising a cage consisting of two U-shaped rolled channel sections, one of said sections having a floor portion providing a lower bearing surface and upstanding legs forming the end walls of the cage, the lower face of said floor portion being notched intermediate its ends throughout its width, the remaining section being disposed transversely to the first named section and having its floor portion fitted and housed neatly within the said notch and having its leg portions projecting upwardly immediately adjacent the lower bearing surface to form the side walls of the cage, said side walls being spaced from the end walls leaving openings adjacent the corners of the cage for the full height thereof, an upper bearing surface, and a free roller disposed within the cage.

In testimony whereof, I sign my name.

ARTHUR B. SEVERN.

Witness:
Edwin O. Johns.